(12) United States Patent
Hashimoto et al.

(10) Patent No.: US 10,035,504 B2
(45) Date of Patent: *Jul. 31, 2018

(54) APPARATUS FOR CONTROLLING ROTARY ELECTRIC MACHINES

(71) Applicants: DENSO CORPORATION, Kariya, Aichi-pref. (JP); NISSAN MOTOR CO., LTD., Yokohama-shi, Kanagawa (JP)

(72) Inventors: Syo Hashimoto, Kariya (JP); Shuichi Orita, Atsugi (JP)

(73) Assignees: DENSO CORPORATION, Kariya (JP); NISSAN MOTOR CO., LTD., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/505,873

(22) PCT Filed: Aug. 21, 2015

(86) PCT No.: PCT/JP2015/073574
§ 371 (c)(1),
(2) Date: Feb. 22, 2017

(87) PCT Pub. No.: WO2016/027890
PCT Pub. Date: Feb. 25, 2016

(65) Prior Publication Data
US 2017/0267229 A1    Sep. 21, 2017

(30) Foreign Application Priority Data

Aug. 22, 2014  (JP) .................................. 2014-169110

(51) Int. Cl.
*B60W 20/15*    (2016.01)
*B60L 11/18*    (2006.01)
(Continued)

(52) U.S. Cl.
CPC .......... *B60W 20/15* (2016.01); *B60L 11/1803* (2013.01); *B60W 10/06* (2013.01);
(Continued)

(58) Field of Classification Search
CPC ...... B60W 20/15; B60W 10/06; B60W 10/08; B60W 30/20; B60W 2030/206;
(Continued)

(56) References Cited

U.S. PATENT DOCUMENTS 8,901,872 B2 * 12/2014 Tazawa .................... H02P 6/10
                                                    318/560
2012/0330485 A1   12/2012 Tamagawa

FOREIGN PATENT DOCUMENTS

JP    2007-224814 A    9/2007
JP    2009-284761 A    12/2009
(Continued)

OTHER PUBLICATIONS

Sep. 15, 2015 International Search Report issued in International Patent Application No. PCT/JP2015/073574.

*Primary Examiner* — Marthe Y Marc-Coleman
(74) *Attorney, Agent, or Firm* — Oliff PLC

(57) ABSTRACT

A filter processor of a control apparatus for a rotary electric machine filters target torque for the rotary electric machine to suppress a vibrational frequency component of a drivetrain using a filter having a frequency transfer characteristic. A controller performs drive control of the rotary electric machine according to the filtered target torque. A parameter calculator calculates, according to a running condition of the vehicle, a parameter associated with a request value for responsivity of output torque of the rotary electric machine with respect to the target torque. A variable setter variably sets the frequency transfer characteristic of the filter to decrease a degree of attenuation of the vibrational frequency
(Continued)

component with an increase of the request value for the responsivity of the output torque.

7 Claims, 3 Drawing Sheets

(51) Int. Cl.
*B60W 10/06* (2006.01)
*B60W 10/08* (2006.01)
*B60W 30/20* (2006.01)

(52) U.S. Cl.
CPC ............ *B60W 10/08* (2013.01); *B60W 30/20* (2013.01); *B60L 2210/42* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60W 2030/206* (2013.01); *B60W 2510/0638* (2013.01); *B60W 2510/0657* (2013.01); *B60W 2510/081* (2013.01); *B60W 2510/083* (2013.01); *B60W 2510/18* (2013.01); *B60W 2520/10* (2013.01); *B60W 2540/10* (2013.01); *B60W 2710/0666* (2013.01); *B60W 2710/083* (2013.01)

(58) Field of Classification Search
CPC . B60W 2510/0638; B60W 2510/0657; B60W 2510/081; B60W 2510/083; B60W 2510/18; B60W 2520/10; B60W 2540/10; B60W 2710/0666; B60W 2710/083; B60L 11/1803; B60L 2210/42; B60L 2240/12; B60L 2240/421; B60L 2240/423; B60L 2240/441; B60L 2240/443
USPC .................................................. 701/22, 111
See application file for complete search history.

(56) References Cited

FOREIGN PATENT DOCUMENTS

| | | |
|---|---|---|
| JP | 2013-223372 A | 10/2013 |
| JP | 2015-089735 A | 5/2015 |
| JP | 2016-039661 A | 3/2016 |
| JP | 2016-046904 A | 4/2016 |

* cited by examiner

APPARATUS FOR CONTROLLING ROTARY ELECTRIC MACHINES

TECHNICAL FIELD

The present invention relates to apparatuses for controlling a rotary electric machine that supplies drive power to a driving wheel of a vehicle via a drivetrain.

BACKGROUND

Such control apparatuses include a control apparatus for suppressing vibrational frequency components occurring from the drivetrain, which is for example disclosed in the following patent document 1. In detail, the control apparatus, which is installed in a vehicle, filters target torque for a motor as an example of rotary electric machines to suppress such vibrational frequency components contained in the target torque. Then, the control apparatus controls actual output torque of the motor using the filtered target torque.

CITATION LIST

Patent Document

[Patent Document 1] Japanese Patent Publication No. 5324623

SUMMARY

Technical Problem

The control of actual output torque of a motor based on the filtered target torque may reduce the responsivity of the control as compared with the control of actual output torque of the same motor based on unfiltered target torque. The control of actual output torque of the motor with respect to the filtered target torque may therefore cause a disadvantage, such as reduction of the driver's drivability of the vehicle, under some situations where higher responsivity of the torque control of the motor is desired, including a situation where the driver wants to make the vehicle maneuver quickly.

The present invention has a main object to provide control apparatuses for rotary electric machines; each of the control apparatuses is capable of reducing a disadvantage due to filtering of target torque to suppress a vibrational frequency component included in the target torque.

Means for Solving Problem

The following describes means for solving the problem, and the operations and achieved effects of the means.

One aspect of the present invention is a control apparatus for a rotary electric machine of a vehicle. The vehicle is equipped with a drivetrain for transmitting power output from the rotary electric machine to a driving wheel. The control apparatus includes a filter processor that filters target torque for the rotary electric machine to suppress a vibrational frequency component of the drivetrain using a filter having a frequency transfer characteristic. The control apparatus includes a controller that performs drive control of the rotary electric machine according to the filtered target torque. The control apparatus includes a parameter calculator that calculates, according to a running condition of the vehicle, a parameter associated with a request value for responsivity of output torque of the rotary electric machine with respect to the target torque. The control apparatus includes a variable setter that variably sets the frequency transfer characteristic of the filter to decrease a degree of attenuation of the vibrational frequency component with an increase of the request value for the responsivity of the output torque.

The control apparatus according to the one aspect of the present invention calculates the parameter associated with the request value for the responsivity of the output torque of the rotary electric machine according to the running condition of the vehicle. That is, the calculated parameter serves as a parameter for calculating how the responsivity of the output torque or the rotary electric machine, i.e. how the responsivity of torque control, is set. The one aspect of the present invention variably sets the frequency transfer characteristic of the filter to decrease the degree of attenuation of the vibrational frequency component when calculating, based on the parameter, an increase of the request value for the responsivity of the output torque.

This reduces the delay in phase of the filter transfer characteristics, thus reducing the response delay of an output value from the filter in response to an input value to the filter.

This performs an increase of the responsivity of the torque control prior to an increase of degree of attenuation of the vibrational frequency component if the request value for the responsivity of the torque control is increased, such as if there is a situation where the driver has an intention to make the vehicle maneuver quickly.

Additionally, the one aspect of the present invention performs an increase of degree of attenuation of the vibrational frequency component prior to an increase of the responsivity of the torque control if the request value for the responsivity of the torque control is decreased, such as if there is a situation where the driver has an intention to run the vehicle VEH with a higher degree of comfort.

That is, the one aspect of the present invention reduces a disadvantage due to filtering of the target torque.

DESCRIPTION OF EMBODIMENTS

Figure 1:
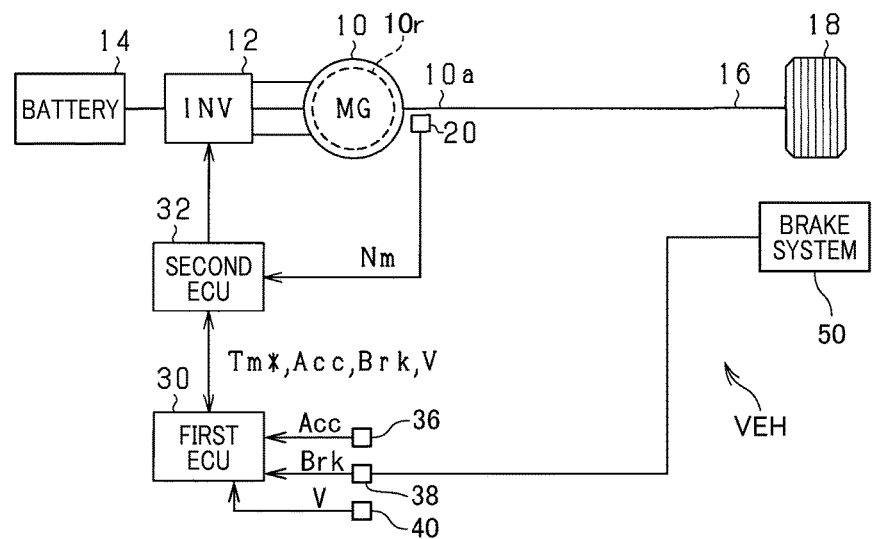
FIG. 1 is a block diagram schematically illustrating an example of the structure of a control system installed in a vehicle according to the first embodiment of the present invention.

The following describes embodiments of the present invention with reference to the accompanying drawings. In the embodiments, like parts between the embodiments, to which like reference characters are assigned, are omitted or simplified to avoid redundant description.

First Embodiment

The following describes the first embodiment in which a control apparatus according to the present invention is applied to a vehicle equipped with a rotary electric machine that only serves as the main engine of the vehicle.

Referring to FIG. 1, the vehicle VEH includes a motor-generator (MG) 10, an inverter 12, a battery 14, a drive shaft 16, and driving wheels 18. The vehicle VEH also includes a first electronic control unit (ECU) 30 and a second ECU 32.

The motor-generator 10 serves as both a motor and a generator; the motor serves as a driving source for running the vehicle VEH. The first embodiment uses a multiphase rotary machine, particularly, a three-phase rotary machine including three-phase windings (U, V, W-phase windings) as the motor-generator 10. Specifically, the first embodiment is capable of using, for example, a three-phase synchronous motor as the motor-generator 10.

A three-phase voltage-controlled inverter is used as the inverter 12 when a three-phase rotary machine is used as the motor-generator 10. The inverter 12 converts a direct-current (DC) voltage output from the battery 14 into an alternating-current (AC) voltage, and applies the AC voltage to the motor-generator 10. This voltage application causes the motor-generator 10 to serve as a motor. In contrast, the motor-generator 10 serves as a generator based on driving power received from the drive shaft 16.

The motor-generator 10 has a rotor 10r and an output shaft 10a, which will be referred to as a motor output shaft 10a, coupled to the rotor 10r.

To the output shaft 10a, the driving wheels 18 are coupled via the drive shaft 16. The first embodiment defines, for example, a drivetrain including the motor output shaft 10a and the drive shaft 16.

The vehicle VEH further includes a rotational speed sensor 20. The rotational speed sensor 20 measures a rotational speed of the motor output shaft 10a, i.e. the rotor 10r, which will be referred to as a motor rotational speed. The measurement value of the rotational speed sensor 20 is input to the second ECU 32. Note that the first embodiment can provide a sensor in the vehicle VEH; the sensor is capable of measuring an electrical rotational angle or an electrical rotational angular velocity of the rotor 10r of the motor-generator 10. In this case, the second ECU 32 can calculate the motor rotational speed Nm according to the measured electrical rotational angle or electrical angular speed of the rotor 10r.

The vehicle VEH additionally includes current sensors. The current sensors are operative to measure currents flowing through at least two windings, for example, V- and W-phase windings, in the three-phase windings of the motor-generator 10 as V- and W-phase currents. Then, the current sensors send the measured V- and W-phase currents to the second ECU 32.

Each of the first and second ECUs 30 and 32 is designed as, for example, a microcomputer including, for example, a CPU, a ROM, a RAM, and an input/output (I/O) unit. Each of the first and second ECUs 30 and 32, i.e. a corresponding CPU, runs various programs stored in, for example, the ROM. The first and second ECUs 30 and 32 are configured to communicate info' illation with each other.

The first ECU 30 is superior in hierarchy to the second ECU 32. That is, the first ECU 30 is, for example, an upstream control unit relative to the second ECU 32 in the flow of addressing vehicle's user requests. For example, the first ECU 30 supervises overall control of the vehicle VEH. Specifically, the first ECU 30 determines target torque, referred to as target MG torque, Tm* for the motor-generator 10 according to measurement signals including, for example, (1) A user's operated (depressed) quantity, i.e. stroke, Acc of a user-operable accelerator pedal of the vehicle VEH, which will be referred to as an accelerator operation stroke Acc (2) A user's operated (depressed) quantity, i.e. stroke, Brk of a user-operable brake pedal of the vehicle VEH, which will be referred to as a brake operated stroke Brk (3) A running speed V of the vehicle VEH.

In the first embodiment, if the target MG torque Tm* is positive, the control mode of the inverter 12 by the second ECU 32 is set to a power running mode for causing the motor-generator 10 to serve as a motor. In contrast, if the target MG torque Tm* is negative, the control mode of the inverter 12 by the second ECU 32 is set to a regenerative mode for causing the motor-generator 10 to serve as a generator. In particular, the first embodiment increases a value of the target MG torque Tm* with an increase of the accelerator operation stroke Acc in the power running mode.

The brake operated stroke Brk represents a value of driver's requested brake torque for slowing down the vehicle VEH. In other words, the second ECU 32 calculates a value of the driver's requested brake torque for slowing down the vehicle VEH according to the brake operated stroke Brk.

In addition, the first ECU 30 outputs the target MG torque Tm* to the second ECU 32.

For example, in the first embodiment, an accelerator-pedal sensor 36 is provided to measure the accelerator operation stroke Acc, and send the accelerator operation stroke Acc to the first ECU 30. For example, in the first embodiment, a brake-pedal sensor 38 is provided to measure the brake operated stroke Brk, and send the brake operated stroke Brk to the first ECU 30. For example, in the first embodiment, a vehicle speed sensor 40 is provided to measure the running speed V of the vehicle VEH, and send the running speed V to the first ECU 30.

The second ECU 32 serves as a control unit for controlling the motor-generator 10. The second ECU 32 receives the target MG torque Tm*, the accelerator operation stroke Acc, the brake operated stroke Brk, and the running speed V input from the first ECU 30, and receives the measurement values input from the rotational speed sensor 20. Then, the second ECU 32 operates, based on the received input values, in the power running mode or the regenerative mode to control on-off operations of, for example, bridge-connected switching elements of the inverter 12. This converts the DC voltage output from the battery 14 into controlled three-phase AC voltages, thus applying the controlled three-phase AC voltages to the three-phase windings of the motor-generator 10. This controls torque of the motor-generator 10 for rotating the rotor 10r to follow the target MG torque Tm*.

In particular, in the regenerative mode, the second ECU 32 performs a regenerative control task. The regenerative control task is configured to (1) Calculate the driver's requested brake torque for slowing down the vehicle VEH according to the brake operated stroke Brk (2) Satisfy the calculated driver's requested brake torque based on a negative value of output torque of the motor-generator 10 controlled to follow a negative value of the target MG torque Tm* and brake torque generated by a brake system 50 for applying brake force to each wheel of the vehicle VEH to slow down the vehicle VEH.

The negative value of the output torque of the motor-generator 10, which will also be referred to as regenerative torque of the motor-generator 10, serves the motor-generator 10 as a generator to generate AC electrical energy, i.e. regenerative power, based on kinetic energy of the driving wheels 18 of the vehicle VEH. The generated AC electrical energy is converted into DC electrical energy by the inverter 12, and the DC electrical energy is charged into the battery 14.

The second ECU 32 of the first embodiment shifts its operating mode to the regenerative mode from the power running mode to perform the regenerative control task of the motor-generator 10 on the conditions that (1) The vehicle running speed V is equal to or higher than a predetermined threshold speed predetermined to be higher than zero (2) The driver is not operating the accelerator pedal (3) The driver is operating the brake pedal.

The second ECU 32 is capable of determining whether the driver is not operating the accelerator pedal according to the accelerator operation stroke Acc, and determining whether the driver is operating the brake pedal according to the brake operated stroke Brk.

The second ECU 32 operates in the regenerative mode under one of the following conditions:

(1) The vehicle VEH is slowing down while the driver is operating the brake pedal (2) The vehicle VEH is running downhill while the running speed V is maintained at a predetermined speed with the brake pedal being operated by the driver.

In the regenerative mode, the second ECU 32 can calculate the vehicle speed V according to the motor rotational speed Nm.

Figure 2:
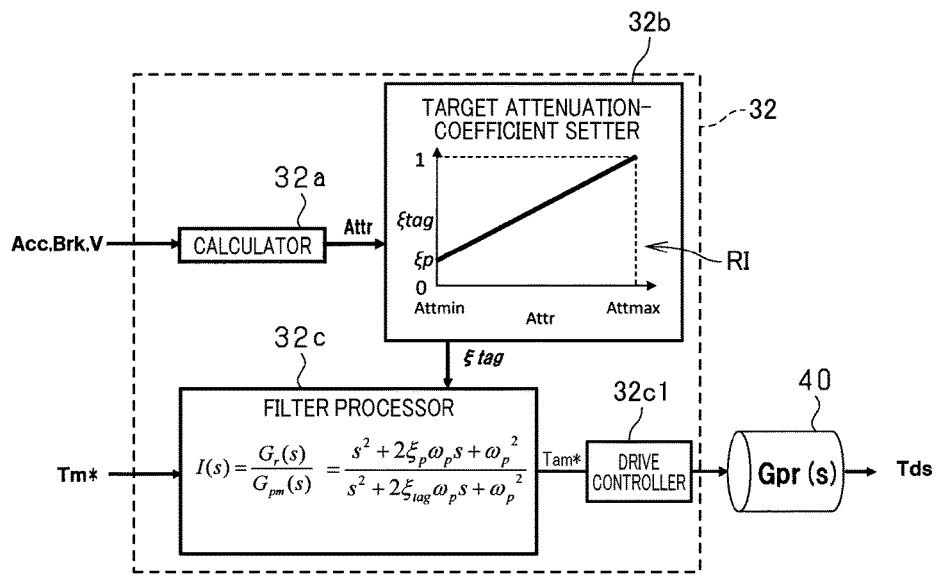
FIG. 2 is a block diagram schematically illustrating an example of the structure of a second ECU illustrated in FIG. 1.

Next, the following describes an example of torque control of the motor-generator 10 performed by the second ECU 32 based on the target MG torque Tm* with reference to the block diagram of FIG. 2.

As illustrated in FIG. 2, the second ECU 32 includes a calculator 32a, a target attenuation-coefficient setter 32b, a filter processor 32c, and a drive controller 32c1. These elements 32a to 32c1 can be implemented in the second ECU 32 as hardware elements, software elements, and/or hardware-software hybrid elements.

The calculator 32a, target attenuation-coefficient setter 32b, filter processor 32c, and drive controller 32c1 are configured to suppress resonance of the drivetrain when, for example, the target MG torque Tm* rapidly changes, thus suppressing vibrations of the vehicle VEH.

Resonance of the drivetrain occurs due to, for example, resonant frequency components of the drivetrain contained in the target MG torque Tm* when, for example, the target MG torque Tm* suddenly changes. For example, the resonance of the drivetrain can be expressed as a known torsional vibration model, more specifically as a known first harmonic drivetrain torsional vibration model.

Specifically, the torsional vibration model of the drivetrain is comprised of a model including the moment of inertia of the motor-generator 10 and the equivalent mass moment of inertia of the vehicle VEH linked together via a torsional spring. The resonant frequency frz of the drivetrain is variably set within, for example, the range from 2 to 10 Hz inclusive.

The calculator 32a, which serves as, for example, a parameter calculator, calculates, according to running conditions of the vehicle VEH including the accelerator operation stroke Acc, the brake operated stroke Brk, and/or the running speed V, an attenuation parameter Attr. The attenuation parameter Attr serves as a parameter associated with a request value for the responsivity of the actual output torque Tm of the motor-generator 10 with respect to the target MG torque Tm*; the responsivity will be referred to as a torque responsivity of the motor-generator 10. The attenuation parameter Attr also serves as a parameter for determining how vibrational frequency components are attenuated.

Specifically, the calculator 32a calculates the attenuation parameter Attr such that the attenuation parameter Attr decreases with an increase of the request value for the torque responsivity of the motor-generator 10.

In particular, the calculator 32a reduces the attenuation parameter Attr with an increase of change of the accelerator operation stroke Acc per unit time. In other words, the calculator 32a adjusts the attenuation parameter Attr such that a value of the attenuation parameter Attr for a first case is smaller than a value of the attenuation parameter Attr for a second case. The first case represents a case where an increase of the accelerator operation stroke Acc per unit time is greater than a predetermined threshold change, i.e. a predetermined threshold increase, of the accelerator operation stroke Acc per unit time. The second case represents a case where an increase of the accelerator operation stroke Acc per unit time is equal to or smaller than the predetermined threshold change, i.e. the predetermined threshold increase, of the accelerator operation stroke Acc per unit time.

Additionally, the calculator 32a reduces a value of the attenuation parameter Attr during execution of the regenerative control task to be smaller than a value of the attenuation parameter Attr while the regenerative control task is not being executed. The calculator 32a can determine whether the second ECU 32 is carrying out the regenerative control task according to the accelerator operation stroke Acc, the brake operated stroke Brk, and the running speed V.

Specifically, the calculator 32a is capable of determining, according to the accelerator operation stroke Acc, the brake operated stroke Brk, and/or the running speed V, (1) Whether the driver has an intention to make the vehicle VEH accelerate (2) Whether the regenerative control task is being performed.

The target attenuation-coefficient setter, which serves as a variable setter, 32b variably sets a target attenuation-coefficient $\xi_{tag}$, which represents a target value of the degree of attenuation of the vibrational frequency components, according to the attenuation parameter Attr. For example, the target attenuation-coefficient setter 32b of the first embodiment can have relational information RI, such as a two-dimensional map illustrated in FIG. 2 or an equation, in which values of the target attenuation-coefficient $\xi_{tag}$ correlating with corresponding values of the attenuation parameter Attr are included. In FIG. 2, the relational information RI represents that the target attenuation-coefficient $\xi_{tag}$ is a linear function of the attenuation parameter Attr with a positive gradient.

In this case, the target attenuation-coefficient setter 32b refers to the relational information RI using a value of the attenuation parameter Attr as input data to read a value of the target attenuation-coefficient $\xi_{tag}$ corresponding to the input data value of the attenuation parameter Attr. Then, the target attenuation-coefficient setter 32b outputs the value of the target attenuation-coefficient $\xi_{tag}$ to the filter processor 32c.

For example, the target attenuation-coefficient setter 32b increases the target attenuation-coefficient $\xi_{tag}$ with an increase of the attenuation parameter Attr. In particular, the target attenuation-coefficient setter 32b of the first embodiment sets the target attenuation-coefficient $\xi_{tag}$ to a prescribed attenuation-coefficient $\xi_p$ when the attenuation parameter Attr becomes its minimum value Attmin, and to 1 when the attenuation parameter Attr becomes its maximum value Attmax. Note that the prescribed attenuation-coefficient $\xi_p$ is previously set to be a value more than zero and less than 1.

The filter processor, which serves as a filter processing unit, 32c filters the target MG torque Tm* based on a filter having predetermined filter transfer characteristics I(s) while adjusting the filter transfer characteristics I(s) according to the target attenuation-coefficient $\nu_{tag}$ output from the target attenuation-coefficient setter 32b.

Let us describe the filter transfer characteristics I(s) according to the first embodiment.

First, let us develop frequency transfer characteristics of a vehicle plant model having torque output from the motor-generator 10 to the motor output shaft 10a as its input, and output torque Tds of the drive shaft 16 as its output. The frequency transfer characteristics will also be referred to as modeled transfer characteristics Gpm(s). The first embodiment expresses the equations of motion of a vehicle by the following equations [eq1] to [eq6]:

$$J_m \cdot \frac{d}{dt}\omega_m = T_m - \frac{T_{ds}}{N_{al}} \quad [eq1]$$

$$2J_w \cdot \frac{d}{dt}\omega_w = T_{ds} - r \cdot F \quad [eq2]$$

$$M_c \cdot \frac{d}{dt}V_c = F \quad [eq3]$$

$$T_{ds} = K_d \cdot \theta \quad [eq4]$$

$$F = K_t(r \cdot \omega_m - V_c) \quad [eq5]$$

$$\theta = \int \left(\frac{\omega_m}{N_{al}} - \omega_w\right) dt \quad [eq6]$$

Where:

$J_m$ represents the inertia of the motor-generator 10, i.e. the rotor 10r $J_w$ represents the inertia of the driving wheels 18

$\omega_m$ represents the angular frequency of the rotor 10r of the motor-generator 10

$\omega_w$ represents the angular frequency of the driving wheels 18

$T_m$ represents output torque of the motor-generator 10

$T_{ds}$ represents actual output torque of the driving wheels 18, i.e. the drive shaft 16

$N_{al}$ represents an overall gear ratio of the vehicle VEH $K_d$ represents torsional rigidity of the drivetrain, i.e. the drive shaft 16

$K_t$ represents a coefficient of friction between each wheel, i.e. tire, and the corresponding road surface r represents a dynamic loaded radius of each wheel (tire)

F represents drive power of the vehicle $M_c$ represents the mass of the vehicle VEH $V_c$ represents the running speed of the vehicle VEH $\theta$ represents a twist angle of the drive shaft 16.

Performing Laplace transform of these equations [eq1] to [eq6] results in expression of the modeled transfer characteristics Gpm(s) by the following equation [eq7]:

$$Gpm(s) = \frac{T_{ds}}{T_m} = \frac{K_d(p_1 \cdot s + p_0)}{a_3 \cdot s^3 + a_2 \cdot s^2 + a_1 \cdot s + a_0} = \frac{K_d(p_1 \cdot s + p_0)}{a_3(s+\alpha)(s^2 + 2\xi_p \cdot \omega_p \cdot s + \omega_p^2)} \quad [eq7]$$

Where $$p_1 = \cdot \frac{2J_m \cdot M_c}{N_{al}}$$

$$p_0 = \frac{K_t(2J_w + r^2 \cdot M_c)}{N_{al}}$$

$$a_3 = 2J_m \cdot J_w \cdot M_c$$

$$a_2 = K_t \cdot J_m(2J_w + r^2 \cdot M_c)$$

$$a_1 = K_d \cdot M_c\left(J_m + \frac{2J_w}{N_{al}^2}\right)$$

$$a_0 = K_d \cdot K_t\left(J_m + \frac{2J_w}{N_{al}^2} + \frac{r^2 \cdot M_c}{N_{al}^2}\right)$$

In the equation [eq7], reference character s represents the Laplace operator, and reference character $\xi_p$ of the second-order lag element represents the prescribed attenuation-coefficient, which is an attenuation-coefficient for the drivetrain. In the equation [eq7], reference character $\omega p$ of the second-order lag element represents a resonant angular frequency, i.e. a natural angular frequency, of the drivetrain. The first embodiment respectively sets the resonant angular frequency $\omega p$ and the prescribed attenuation-coefficient $\xi_p$ to fixed values. The reason why the modeled transfer characteristics Gpm(s) are expressed by the equation [eq7] is that actual frequency transfer characteristics Gpr(s) of the drivetrain, to which reference character 40 is assigned, are approximated by the equation [eq7].

Next, let us express target frequency transfer characteristics of a target vehicle plant model, which has torque output from the motor-generator 10 to the motor output shaft 10a as an input, and output torque Tds of the drive shaft 16 as an output, by the following equation [eq8]:

$$Gr(s) = \frac{K_d(p_1 \cdot s \cdot p_0)}{a_3(s+\alpha)(s^2 + 2\xi_{tag} \cdot \omega_p \cdot s + \omega_p^2)} \quad [eq8]$$

Where Gr(s) represents the target frequency transfer characteristics of the target vehicle plant model, which will be referred to as target transfer characteristics.

Replacing the prescribed attenuation-coefficient $\xi_p$ described in the equation [eq7] with the target attenuation-coefficient $\xi_{tag}$ obtains the equation [eq8].

From the equations [eq7] and [eq8], the following equation [eq9], which expresses the filter transfer characteristics I(s), is derived as follows:

$$I(s) = \frac{Gr(s)}{Gpm(s)} = \frac{s^2 + 2\xi_p \cdot \omega_p \cdot s \cdot \omega_p^2}{s^2 + 2\xi_{tag} \cdot \omega_p \cdot s + \omega_p^2} \quad [eq9]$$

The dimension of the target transfer characteristics Gr(s) and the dimension of the modeled transfer characteristic Gpm(s) are identical to each other, resulting in the filter transfer characteristics I(s) being non-dimensional characteristics. The inverse of the modeled transfer characteristic Gpm(s) in the filter transfer characteristics I(s) serves as an inverse filter for suppressing resonance of the drivetrain.

This configuration sets the target attenuation-coefficient $\xi_{tag}$ to the prescribed attenuation-coefficient $\xi_p$ when the attenuation parameter Attr becomes its minimum value Attmin. This setting causes the filter transfer characteristics I(s) to be 1, resulting in the target MG torque Tm*, which is input to the filter processor 32d, being output from the filter processor 32d unchanged.

In contrast, the configuration sets the target attenuation-coefficient $\xi_{tag}$ to 1 when the attenuation parameter Attr becomes its maximum value Attmax, resulting in the target MG torque Tm*, which is input to the filter processor 32c, being output from the filter processor 32c while being attenuated.

FIG. 2 schematically illustrates the target MG torque Tm* output from the filter processor 32c as filtered target MG torque, i.e. filtered target MG torque, Tam*.

Figure 3A:
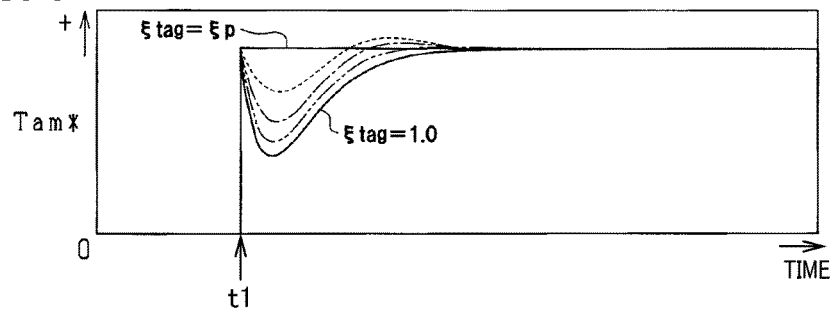
FIG. 3A is a graph schematically illustrating how curves of filtered target MG torque change over time; the curves correspond to different values of a target attenuation-coefficient.
Figure 3B:
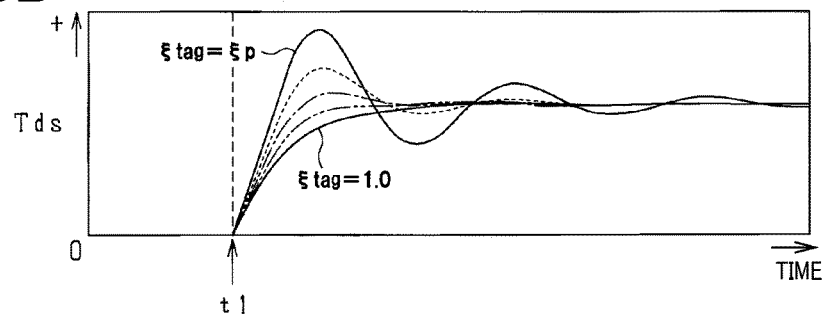
FIG. 3B is a graph schematically illustrating how curves of output torque of a drive shaft illustrated in FIG. 1 change over time; the curves correspond to different values of the target attenuation-coefficient.

FIG. 3A schematically illustrates how curves of the filtered target MG torque Tam* change over time; the curves are obtained when corresponding values of the target attenuation-coefficient $\xi_{tag}$ are set to different values within the range from 1 to the prescribed attenuation-coefficient $\xi_p$. FIG. 3B also schematically illustrates how curves of the output torque Tds of the drive shaft 16 change over time; the curves are obtained when corresponding values of the target attenuation-coefficient $\xi_{tag}$ are set to different values within the range from 1 to the prescribed attenuation-coefficient $\xi_p$.

For example, each of FIGS. 3A and 3B shows the curve, which is obtained when the corresponding target attenuation-coefficient $\xi_{tag}$ is set to the prescribed attenuation-coefficient $\xi_p$, drawn by a solid line. Similarly, each of FIGS. 3A and 3B shows the curve, which is obtained when the target attenuation-coefficient $\xi_{tag}$ is set to 1, drawn by a solid line.

In addition, each of FIGS. 3A and 3B shows the curves, which are obtained when corresponding three different values are assigned to the target attenuation-coefficient $\xi_{tag}$, drawn by respective dashed, dot-and-dash, and two-dot chain lines. The dashed, dot-and-dash, and two-dot chain curves have a characteristic that the corresponding values of the target attenuation-coefficient $\xi_{tag}$ increase in the order from the dashed curve, the dot-and-dash curve, to the two-dot chain curve.

FIGS. 3A and 3B show that the target MG torque Tm* rises steeply in a step function at time t1, and after the time t1, show that, the smaller the value of the target attenuation-coefficient $\xi_{tag}$ is, the more the responsivity of torque control is improved.

The drive controller 32c1 performs on-off control of the bridge-connected switching elements of the inverter 12 according to the filtered target MG torque Tam* to convert the DC voltage output from the battery 14 into a controlled AC voltage, thus applying the controlled AC voltage to the three-phase windings of the motor-generator 10. This causes output torque of the motor-generator 10 to follow the target MG torque Tam*. The drive controller 32c1 can perform known current vector control as an example of the on-off control of the switching elements of the inverter 12.

For example, the current vector control calculates, from the measured V- and W-phase currents, the remaining phase, i.e. the U-phase, current, and converts the three-phase currents (U-, V-, and W-phase currents) into a current value in a first axis and a current value in a second axis; the first axis and second axis define a rotating Cartesian coordinate system in the rotor 10r. The rotating Cartesian coordinate system rotates as the rotor 10r rotates. The current vector control obtains a first deviation between the first-axis measured current value and a first-axis command current, and a second deviation between the second-axis measured current value and a second-axis command current. Then, the current vector control obtains three-phase AC command voltages that should zero the first and second deviations. The current vector control controls on-off operations of the switching elements of the inverter 12 according to the obtained three-phase command voltages, thus causing output torque of the motor-generator 10 to follow the filtered target MG torque Tam*.

The drive controller 32c1 of the second ECU 32 according to the first embodiment serves as, for example, a controller. In particular, the filtering process of the filter processor 32c1 can convert the filter transfer characteristics I(s) represented in a complex domain, i.e. S domain, into, for example, discretized filter transfer characteristics I(z) in a discretized complex domain, i.e. Z domain. Then, the filtering process of the filter processor 32c1 can perform filtering of the target MG torque Tam* using the discretized filter transfer characteristics I(z).

As described above, the second ECU 32 determines whether the driver has an intention to make the vehicle VEH maneuver quickly according to, for example, an increase of change of the accelerator operation stroke Acc per unit time. Then, the second ECU 32 reduces a value of the attenuation parameter Attr for a case where the driver has an intention to make the vehicle VEH maneuver quickly to be smaller than a value of the attenuation parameter Attr for a case where the driver has no intention to make the vehicle VEH maneuver quickly.

Additionally, the second ECU 32 determines whether the regenerative control task is being performed according to, for example, the accelerator operation stroke Acc, the brake operated stroke Brk, and/or the running speed V. Then, the second ECU 32 reduces a value of the attenuation parameter Attr for a case where the regenerative control task is being performed to be smaller than a value of the attenuation parameter Attr for a case where no regenerative control task is being performed.

The reduction in the value of the attenuation parameter Atp reduces the target attenuation-coefficient $\xi_{tag}$, thus improving the responsivity of the torque control (see FIGS. 3A and 3B).

Specifically, this configuration of the second ECU 32 reduces the delay in phase of the filter transfer characteristics I(s) of the filter, thus reducing the response delay of an output value from the filter in response to an input value to the filter.

This configuration of the second ECU 32 therefore enables both improvement of the driver's drivability of the vehicle VEH and adjustment of regenerative torque of the motor-generator 10 to immediately follow the target MG torque Tm* in the regenerative mode while suppressing vibrations of the drivetrain of the vehicle VEH.

On the other hand, the second ECU 32 increases a value of the attenuation parameter Attr for a case where the driver has an intention to run the vehicle VEH with a higher degree of comfort to be larger than a value of the attenuation parameter Attr for a case where the driver has an intention to make the vehicle VEH maneuver quickly.

The increase in the value of the attenuation parameter Attr increases the target attenuation-coefficient $\xi_{tag}$, thus increasing the degree of attenuation of the target MG torque Tm* (FIGS. 3A and 3B).

Specifically, this configuration of the second ECU 32 enables improvement of the driver's comfortability of the vehicle VEH while improving the effects of suppressing vibrations of the drivetrain of the vehicle VEH.

Second Embodiment

Figure 4:
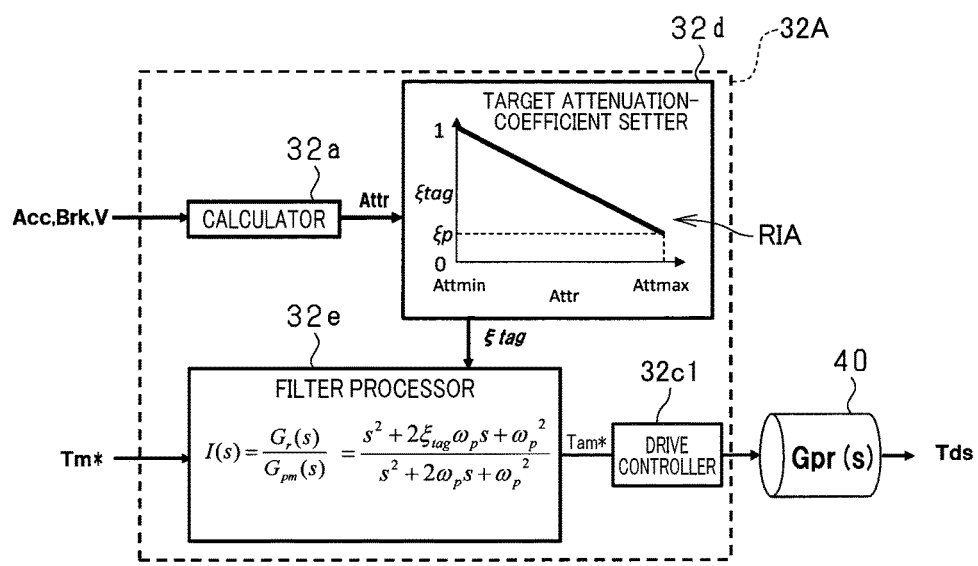
FIG. 4 is a block diagram schematically illustrating an example of the structure of a second ECU according to the second embodiment of the present invention.

The following describes the second embodiment of the present invention with reference to FIG. 4 while focusing on the different points between the second embodiment and the first embodiment.

Referring to FIG. 4, a second ECU 32A of the second embodiment includes a target attenuation-coefficient setter 32d and a filter processor 32e, which differ from the target attenuation-coefficient setter 32b and filter processor 32c, in addition to the components 32a and 32c1.

For example, the target attenuation-coefficient setter 32d of the second embodiment can have relational information RIA, such as a two-dimensional map illustrated in FIG. 4 or an equation, in which values of the target attenuation-coefficient $\xi_{tag}$ correlating with corresponding values of the attenuation parameter Attr are included. In FIG. 4, the relational information RIA represents that the target attenuation-coefficient $\xi_{tag}$ is a linear function of the attenuation parameter Attr with a negative gradient.

In this case, the target attenuation-coefficient setter 32d refers to the relational information RIA using a value of the attenuation parameter Attr as input data to read a value of the target attenuation-coefficient $\xi_{tag}$ corresponding to the input data value of the attenuation parameter Attr. Then, the target attenuation-coefficient setter 32d outputs the value of the target attenuation-coefficient $\xi_{tag}$ to the filter processor 32e.

Specifically, the target attenuation-coefficient setter 32d according to the second embodiment reduces the target attenuation-coefficient $\xi_{tag}$ with an increase of the attenuation parameter Attr. In particular, the target attenuation-coefficient setter 32d according to the second embodiment sets the target attenuation-coefficient $\xi_{tag}$ to 1 when the attenuation parameter Attr becomes its minimum value Attmin, and to the prescribed attenuation-coefficient $\xi_p$ when the attenuation parameter Attr becomes its maximum value Attmax.

The filter processor 32e filters target MG torque Trq* based on predetermined filter transfer characteristics I(s) while adjusting the filter transfer characteristics I(s) according to the target attenuation-coefficient $\xi_{tag}$ output from the target attenuation-coefficient setter 32d. The second embodiment expresses modeled transfer characteristics Gpm(s) by the following equation [eq10]:

$$Gpm(s) = \frac{K_d(p_1 \cdot s + p_0)}{a_3(s+\alpha)(s^2 + 2\xi_{tag} \cdot \omega_p \cdot s + \omega_p^2)} \quad [eq10]$$

Replacing the prescribed attenuation-coefficient $\xi_p$ in the equation [eq7] with the target attenuation-coefficient $\xi_{tag}$ establishes the equation [eq10].

The second embodiment also expresses target transfer characteristics Gr(s) by the following equation [eq11]:

$$Gr(s) = \frac{K_d(p_1 \cdot s + p_0)}{a_3(s+\alpha)(s^2 + 2\omega_p \cdot s + \omega_p^2)} \quad [eq11]$$

Replacing the target attenuation-coefficient $v_{tag}$ in the equation [eq8] with 1 establishes the equation [eq11].

From the equations [eq10] and [eq11], the following equation [eq12], which expresses the filter transfer characteristics I(s), is derived as follows:

$$I(s) = \frac{Gpr(s)}{Gpm(s)} = \frac{s^2 + 2\xi_{tag} \cdot \omega_p \cdot s + \omega_p^2}{s^2 + 2\omega_p \cdot s + \omega_p^2} \quad [eq12]$$

This configuration of the second ECU 32A of the second embodiment sets the target attenuation-coefficient $\xi_{tag}$ to 1 when the attenuation parameter Attr becomes its minimum value Attmin, resulting in the filter transfer characteristics I(s) being 1. This results in the target MG torque Tm*, which is input to the filter processor 32e, being output from the filter processor 32e as it is.

On the other hand, this configuration of the second ECU 32A sets the target attenuation-coefficient $\xi_{tag}$ to the prescribed attenuation-coefficient $\xi_p$ when the attenuation parameter Attr becomes its maximum value Attmax. This results in the target MG torque Tm*, which is input to the filter processor 32e, being output from the filter processor 32e while being attenuated.

That is, controlling the attenuation parameter Attr based on the configuration of the second embodiment enables the degree of attenuation by the filter transfer characteristics I(s), i.e. the level of the torque responsivity, to be adjusted. This therefore achieves the same effects as those achieved by the first embodiment.

Third Embodiment

Figure 5:
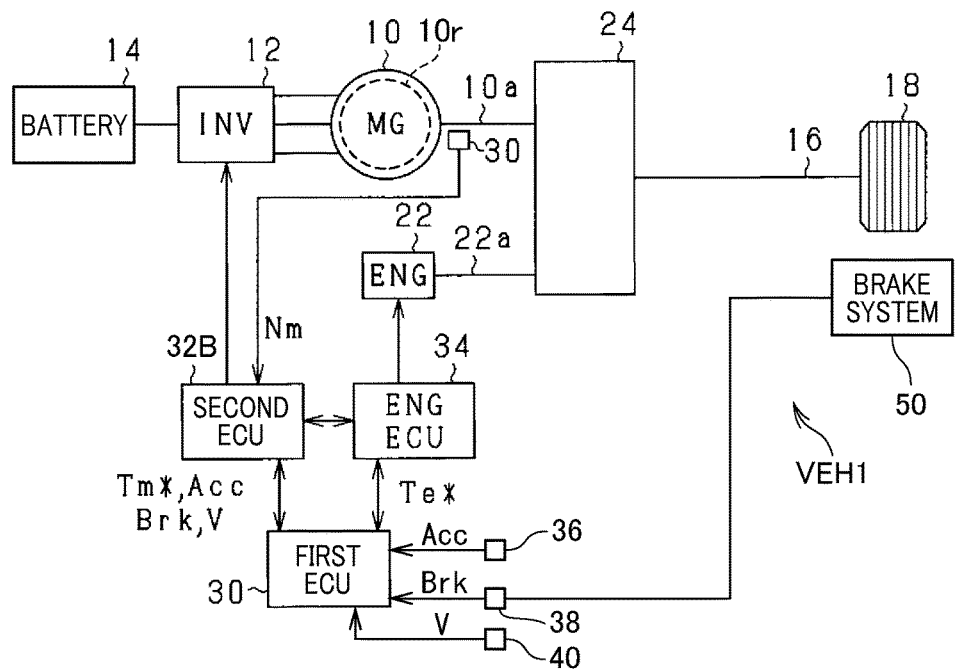
FIG. 5 is a block and structural diagram schematically illustrating an example of the structure of a control system installed in a vehicle according to the third embodiment of the present invention.

The following describes the third embodiment of the present invention with reference to FIG. 5 while focusing on the different points between the third embodiment and the first embodiment.

Referring to FIG. 5, a vehicle VEH1 further includes a known internal combustion engine, referred to as an engine, 22 as a main engine of the vehicle VEH1 in addition to the motor-generator 10.

The vehicle VEH1 also includes a power splitter 24 and a third ECU 34.

The engine 22 has a crankshaft 22a coupled to the power splitter 24. The motor output shaft 10a is also coupled to the motor output shaft 10a.

The power splitter 24 is also coupled to the drive shaft 16. For example, the power splitter 24 is configured to transfer power supplied from at least one of the engine 22 and the motor-generator 10 to the drive shaft 16, and split power supplied from the engine 22 to transfer the first split power to the drive shaft 16 and the second split power to the motor-generator 10. For example, the power splitter 24 is also configured to freely integrate power supplied from the motor-generator 10 and power supplied from the engine 22, and transfer the integrated power to the drive shaft 16. The drivetrain of the third embodiment includes, for example, the motor output shaft 10a, the crankshaft 22a, the power splitter 24, and the drive shaft 16.

The third ECU 34 is designed as, for example, a microcomputer circuit including essentially, for example, a CPU, a ROM, a RAM, and input/output units. The third ECU 34, i.e. a corresponding CPU, runs various programs stored in, for example, the ROM. The first ECU 30, a second ECU 32C, and the third ECU 34 are configured to communicate information with each other.

The first ECU 30 is superior in hierarchy to each of the second and third ECUs 32B and 34.

Specifically, the first ECU 30 calculates request torque Tall of the vehicle VEH1 according to, for example, the accelerator operation stroke Acc. Then, the first ECU 30 splits the request torque Tall into target MG torque Tm* and target torque of the engine 22, which will be referred to as target engine torque Te*. Then, the first ECU 30 outputs the target MG torque Tm* allocated for the motor-generator 10 to the second ECU 32B, and the target engine torque Te* allocated for the engine 22 to the third ECU 34. Note that the third embodiment for example assumes that the target engine torque Te* is set to be equal to or more than zero.

The third ECU 34 serves as a control unit for controlling the engine 22. The third ECU 34 receives at least the target engine torque Te* input from the first ECU 30. The third ECU 34 controls, based on the received target engine torque Te*, the proper quantity of fuel to be sprayed from an injector provided for each cylinder of the engine 22 into the combustion chamber of the corresponding cylinder, and proper ignition timing for an igniter provided for each cylinder of the engine 22. This control of the engine 22 controls actual torque generated from the engine 22 to follow the target engine torque Te*.

Figure 6:
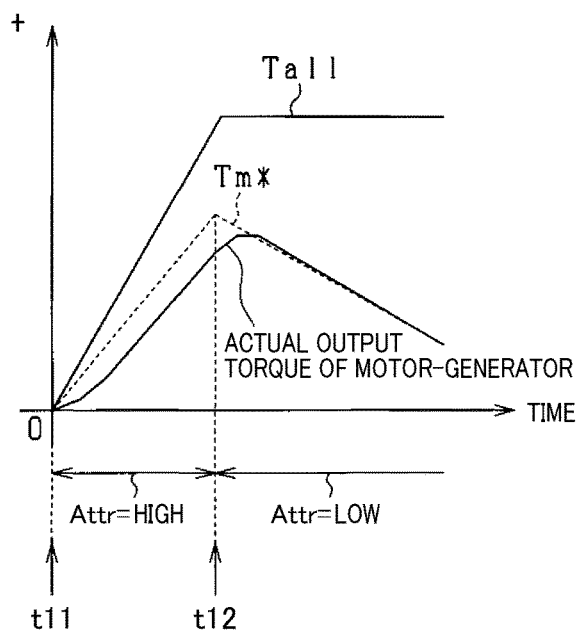
FIG. 6 is a graph schematically illustrating how each of request torque, target MG torque, and actual output torque of the motor-generator according to the third embodiment of the present invention.

The calculator 32a of the second ECU 32B according to the third embodiment adjusts the attenuation parameter Attr such that a value of the attenuation parameter Attr for a first situation is greater than a value of the attenuation parameter Attr for a second situation. The first situation represents a situation where each of the target MG torque Tm* and the target engine torque Te* is more than zero and the request torque Tall of the vehicle VEH1 is transiently increasing (see the period from time t11 to time t12 of FIG. 6). The second situation represents a situation where the request torque Tall of the vehicle VEH1 is in a steady state (see the period after the time t12 of FIG. 6). The situation where each of the target MG torque Tm* and the target engine torque Te* is more than zero shows that power output from each of the motor-generator 10 and the engine 22 is being transferred to the driving wheels 18.

The torque responsivity of the motor-generator 10 is higher than the torque responsivity of the engine 22. This brings the output torque of the motor-generator 10 to have a dominant influence on the integrated output torque of the motor-generator 10 and the engine 22 while the request torque Tall of the vehicle VEH1 is changing, i.e. is increasing (accelerating). Thus, the second ECU 32B increases a value of the attenuation parameter Attr while the request torque Tall of the vehicle VEH1 is changing as compared with a value of the attenuation parameter Attr while the request torque Tall of the vehicle VEH1 is in a steady state. This performs suppressing of vibrations of the vehicle VEH by the filter processor 32c prior to improvement of the driver's drivability of the vehicle VEH1.

In contrast, the second ECU 32B decreases a value of the attenuation parameter Attr while the request torque Tall of the vehicle VEH1 is in a steady state as compared with a value of the attenuation parameter Attr while the request torque Tall of the vehicle VEH1 is changing. This performs adjustment of the actual output torque Tm of the motor-generator 10 to follow the target MG torque Tm* with a higher responsivity prior to suppression of the vibrations of the vehicle VEH1. This therefore results in adjustment of the integrated torque of the motor-generator 10 and the engine 22 to immediately follow the request torque Tall of the vehicle VEH1, thus immediately satisfying the driver's acceleration request. This therefore improves the driver's drivability of the vehicle VEH1.

Modifications

Each embodiment can be modified as follows.

The modeled transfer characteristics Gpm(s) and the target transfer characteristics Gr(s) are not limited to those described in each embodiment. Specifically, each of the modeled transfer characteristics Gpm(s) and the target transfer characteristics Gr(s) can be configured such that (1) The degree of the Laplace operator included in the denominator of the equation of the filter transfer characteristics I(s) according to each embodiment is set to 3 or more (2) The degree of the Laplace operator included in the numerator of the equation of the filter transfer characteristics I(s) according to each embodiment is set to 3 or more.

The target attenuation-coefficient setter 32b of the first embodiment can set the target attenuation-coefficient $\xi_{tag}$ when the limited attenuation parameter Attr becomes its maximum value to a value greater than 1. The target attenuation-coefficient setter 32d of the second embodiment can set the target attenuation-coefficient $\xi_{tag}$ when the limited attenuation parameter Attr becomes its minimum value to a value greater than 1.

The calculator 32a of the third embodiment can adjust the attenuation parameter Attr such that a value of the attenuation parameter Attr for the first situation is smaller than a value of the attenuation parameter Attr for a third situation. The first situation represents a situation where each of the target MG torque Tm* and the target engine torque Te* is more than zero and the request torque Tall of the vehicle VEH1 is increasing. The third situation represents a situation where the request torque Tall of the vehicle VEH1 is decreasing.

The target attenuation-coefficient setter 32b of the first embodiment continuously increases the target attenuation-coefficient $v_{tag}$ with an increase of the limited attenuation parameter Attr, but the present invention is not limited thereto. Specifically, the target attenuation-coefficient setter 32b can increase the target attenuation-coefficient $\xi_{tag}$ in several stages, such as three stages, with an increase of the attenuation parameter Attr. Similarly, the target attenuation-coefficient setter 32d of the second embodiment can decrease the target attenuation-coefficient $\xi_{tag}$ in several stages, such as three stages, with an increase of the attenuation parameter Attr.

The filter processor 32c, which performs filtering process of the target MG torque Tm*, can be installed in the first ECU 30.

The vehicle plant model for the modeled transfer characteristics Gpm(s) and the target transfer characteristics Gr(s) has output torque Tds of the drive shaft 16 as its output, but the present invention is not limited thereto. Specifically, a vehicle plant model having a rotational speed or a twist angle θ of the drive shaft 16 as its output can be used as the vehicle plant model for the modeled transfer characteristics Gpm(s) and the target transfer characteristics Gr(s).

REFERENCE SIGNS LIST

10 Motor-generator
16 Drive shaft
18 Driving wheel
32 Second ECU

The invention claimed is:

1. A control apparatus for a rotary electric machine of a vehicle, the vehicle being equipped with a drivetrain for transmitting power output from the rotary electric machine to a driving wheel, the control apparatus comprising:
   a filter processor that filters target torque for the rotary electric machine to suppress a vibrational frequency component of the drivetrain using a filter having a frequency transfer characteristic;
   a controller that performs drive control of the rotary electric machine according to the filtered target torque;
   a parameter calculator that calculates, according to a running condition of the vehicle, a parameter associated with a request value for responsivity of output torque of the rotary electric machine with respect to the target torque; and
   a variable setter that variably sets the frequency transfer characteristic of the filter to decrease a degree of attenuation of the vibrational frequency component with an increase of the request value for the responsivity of the output torque.

2. The control apparatus according to claim 1, wherein:
   the drivetrain includes a drive shaft coupling between the rotary electric machine and the driving wheel;
   the filter processor is configured to apply, to the target torque, a filtering process based on the filter having the frequency transfer characteristic;
   the frequency transfer characteristic is represented as a fractional expression of a target transfer characteristic over a modeled transfer characteristic;
   the modeled transfer characteristic comprises a frequency transfer characteristic of a plant model of the vehicle;
   the plant model has the output torque of the rotary electric machine as an input thereof, and has, as an output thereof, an output parameter indicative of any one of output torque to the driving wheel, a rotational speed of the drive shaft, and a twist angle of the drive shaft;
   the target transfer characteristic comprises a target frequency transfer characteristic of the plant model; and
   each of the modeled transfer characteristic and the target transfer characteristic includes an N-th order lag element where N is an integer equal to or more than 2.

3. The control apparatus according to claim 2, wherein:
   the N-th order lag element included in the target transfer characteristic has a term including an attenuation coefficient; and
   the variable setter is configured to variably set the attenuation coefficient to increase the attenuation coefficient with an increase of the request value for the responsivity of the output torque.

4. The control apparatus according to claim 3, wherein:
   the variable setter is configured to:
      set the attenuation coefficient to a first value that causes the frequency transfer characteristic to be 1 when the request value for the responsivity of the output torque becomes minimum; and
      set the attenuation coefficient to a second value equal to or more than 1 when the request value for the responsivity of the output torque becomes maximum.

5. The control apparatus according to claim 2, wherein:
   the N-th order lag element included in the modeled transfer characteristic has a term including an attenuation coefficient; and
   the variable setter is configured to variably set the attenuation coefficient to decrease the attenuation coefficient with an increase of the request value.

6. The control apparatus according to claim 5, wherein:
   the variable setter is configured to:
      set the attenuation coefficient to a first value equal to or more than 1 when the request value for the responsivity of the output torque becomes minimum; and
      set the attenuation coefficient to a second value that causes the frequency transfer characteristic to be 1 when the request value for the responsivity of the output torque becomes maximum.

7. The control apparatus according to claim 1, wherein:
   the drivetrain is configured to transfer the power output from the rotary electric machine and power output from an internal combustion engine installed in the vehicle to the driving wheel; and
   the variable setter is configured to variably set the frequency transfer characteristic of the filter such that the degree of attenuation of the vibrational frequency component for a first situation is greater than the degree of attenuation of the vibrational frequency component for a second situation,
   the first situation being a situation where the power output from the rotary electric machine and power output from the engine are being transferred to the driving wheel and the sum of the target torque for the rotary electric machine and second target torque for the internal combustion engine is increasing,
   the second situation being a situation where the sum of the target torque for the rotary electric machine and second target torque for the internal combustion engine is in a steady state.

* * * * *